United States Patent

[11] 3,629,514

[72] Inventor Joseph D. Flamini, Jr.
Addison, Ill.

[21] Appl. No. 7,560
[22] Filed Feb. 2, 1970
[45] Patented Dec. 21, 1971
[73] Assignee G.T.E. Automatic Electric Laboratories Incorporated
Northlake, Ill.

[54] SUBSCRIBER'S HOLDING CIRCUIT
7 Claims, 2 Drawing Figs.

[52] U.S. Cl. .......... 179/99, 179/81 R
[51] Int. Cl. .......... H04m 1/00
[50] Field of Search .......... 179/99, 81 R, 18 BD

[56] References Cited
UNITED STATES PATENTS

| | | | |
|---|---|---|---|
| 2,273,530 | 2/1942 | King .......... | 179/99 |
| 2,810,016 | 10/1957 | Knittle .......... | 179/99 |

*Primary Examiner*—Kathleen H. Claffy
*Assistant Examiner*—William A. Helvestine
*Attorneys*—Cyril A. Krenzer, K. Mullerheim, B. E. Franz and Robert J. Black

ABSTRACT: A circuit arrangement for connection to a telephone subscriber's line where two or more telephone instruments are connected to the same line. The included circuitry permits a subscriber to place a "hold" on the telephone line, by momentarily operating his hookswitch, or dialing the digit "1," if his telephone is equipped with a conventional rotary dial, after which he may hang up and then may continue his conversation at a second telephone instrument, or return to the first telephone.

INVENTOR
JOSEPH D. FLAMINI JR.
BY [signature]
AGENT

SUBSCRIBER'S HOLDING CIRCUIT

FIELD OF THE INVENTION

This invention relates to the ability to place a hold on a subscriber's telephone line, before hanging up the subscriber's instrument and then continuing the telephone call at the same or a different telephone instrument.

DESCRIPTION OF THE PRIOR ART

At the present time it has become common for many telephone subscribers to have one or more extension telephones connected to a telephone line. For a variety of reasons it may be desirable to begin a telephone conversation utilizing one telephone instrument connected to the line, and then complete that same conversation over another telephone connected to the line, or leave the telephone for a period of time and return to complete the conversation. In either situation it is usually undesirable to leave the telephone handset off the hookswitch during the interim when the subscriber is not actually conversing.

If a subscriber moves from one phone to another the necessity for returning to the first telephone to replace the handset is bothersome and quite often forgotten. To this end some telephones have been equipped with so-called "hold keys", which after being operated permit the subscriber to hang up the handset upon the hookswitch of the telephone instrument being used and then return to complete the conversation and remove the hold. However, if the subscriber places a particular instrument on hold after completing the conversation at a second instrument, it still becomes necessary to return to the original instrument and remove the hold if future calls are to be received by that instrument. Obviously the inclusion of a "-hold key" in the telephone instrument is not a complete solution to the particular problem proposed. Likewise the necessity for a special instrument that permits mounting the hold key is an expensive solution.

SUMMARY OF THE INVENTION

The present invention is a circuit arrangement that functions as an interface between a telephone subscriber's line and two or more telephone subscriber instruments. The system as disclosed will permit the place of a "hold" on a telephone line from any one of the subscriber telephone instruments by merely momentarily operating the hookswitch of the telephone instrument (or dialing the digit "1" if it is a rotary dial instrument) and then hanging up. The hold is removed and conversation may continue on the same or any other telephone by removing the handset from the associated hookswitch, of the telephone instrument which the subscriber chooses to utilize.

DESCRIPTION OF THE PREFERRED EMBODIMENT

Figure 1:
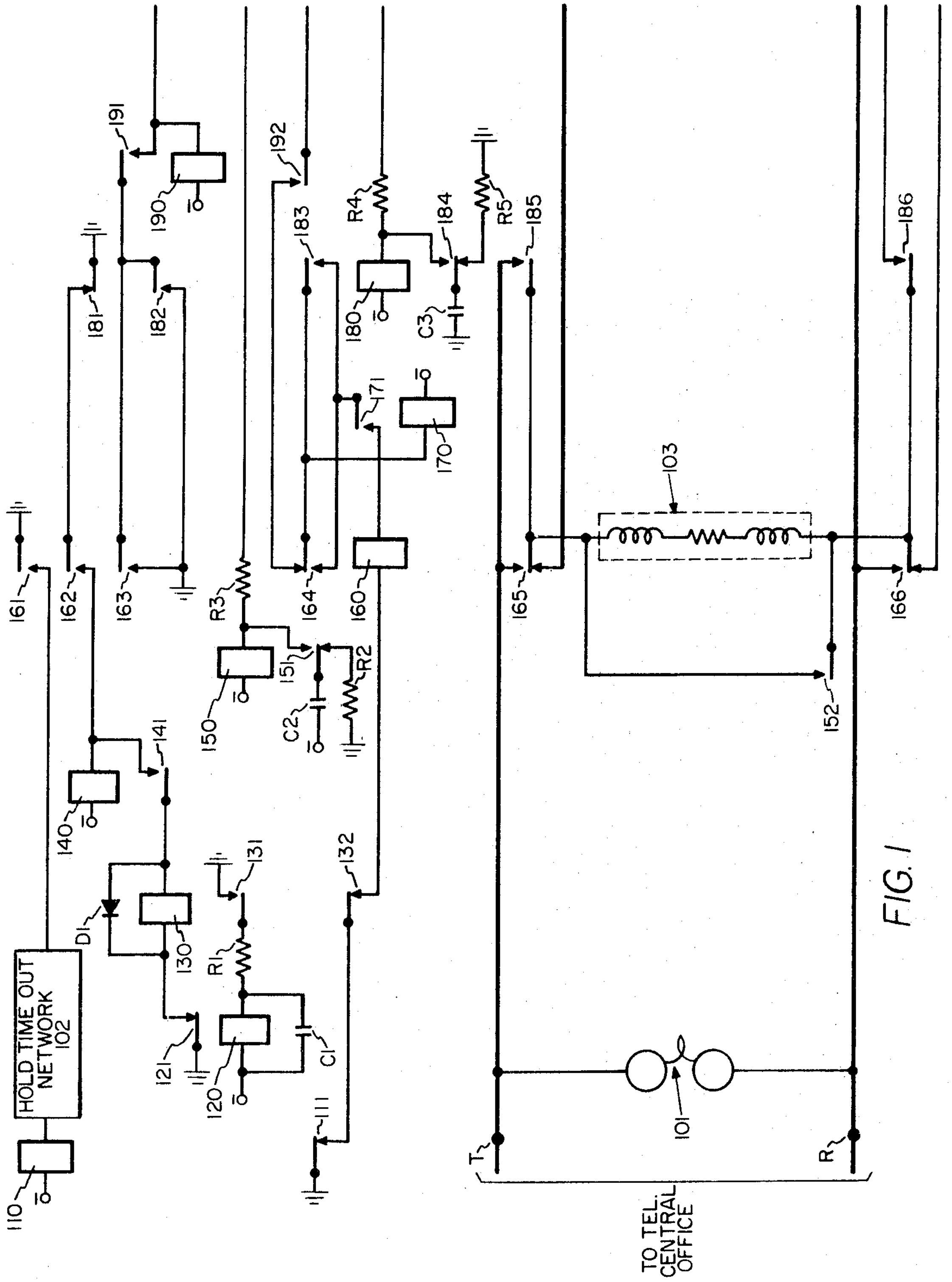
FIGS. 1 and 2 of the accompanying drawings taken in combination comprise a schematic circuit diagram of a telephone subscriber's holding circuit in accordance with the present invention.
Figure 2:
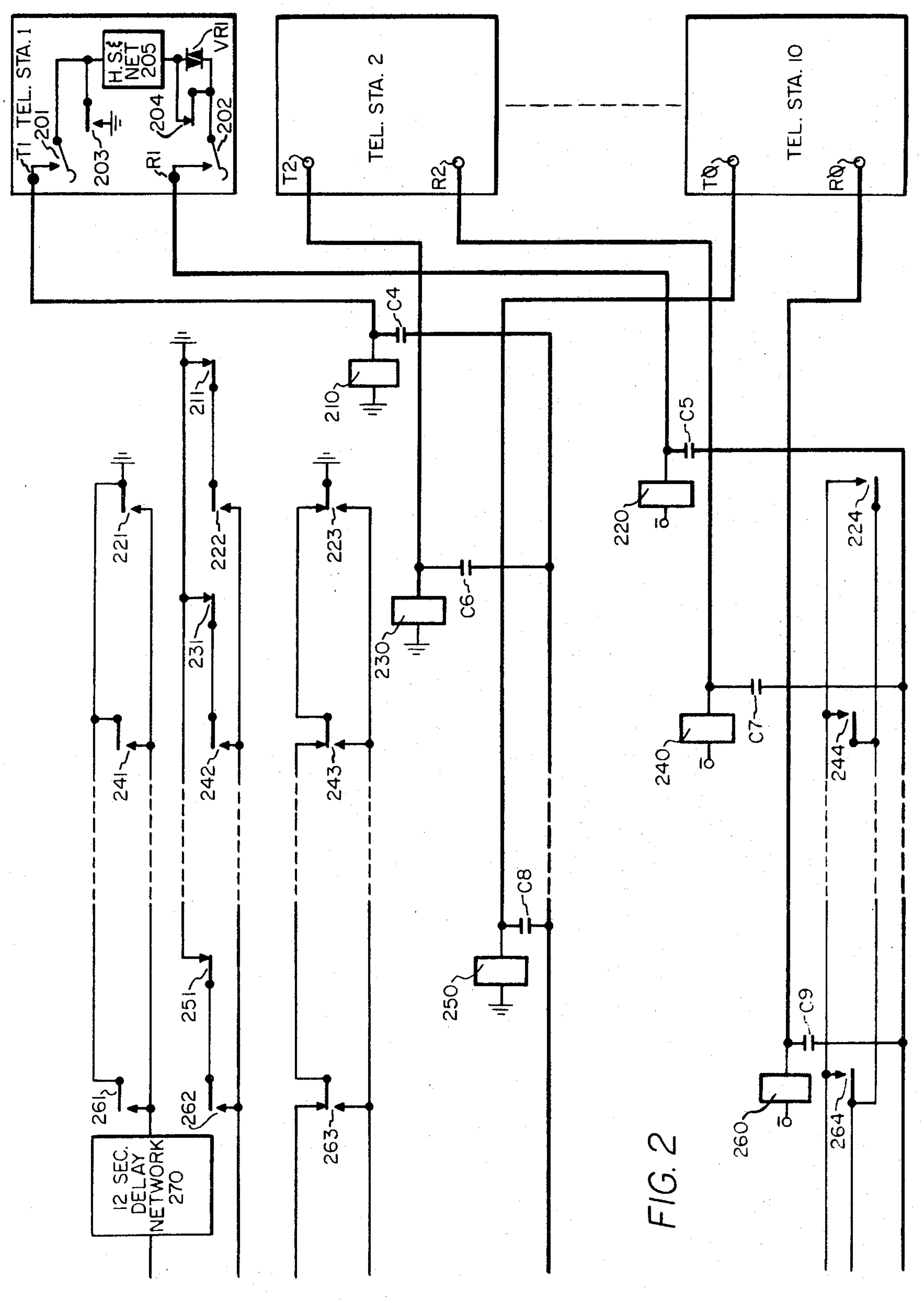

Referring to FIGS. 1 and 2 taken in combination with FIG. 2 placed to the right of FIG. 1, the invention consists of an interface between a subscriber's telephone line and two or more telephone stations. For purposes of convenience three stations designated telephone stations 1, 2 and 10 are shown.

The present circuitry is powered from a local power supply located on the subscriber's premises, which is not shown and which does not constitute a portion of the present invention. Battery feed for the telephone subscriber's instruments is derived from this supply with the telephone line being isolated from any metallic connection to the telephone line by virtue of capacitors such as C4 through C9 inclusive. Battery feed to the individual telephone stations is provided by relays such as 210 and 220 associated with telephone station 1, 230 and 240 associated with telephone station 2 and 250 and 260 associated with telephone station 10.

The individual telephone stations do not include ringing circuitry. Rather one or more ringers are provided on the line side of the system. An example of this is shown with the connection of ringer 101 to the telephone line as shown in FIG. 1.

It is possible to provide lamps for indicating purposes on the telephone station instruments. These function in a manner so as to flash in response to a ringing signal, exhibit a steady state on seizure and wink when the hold condition is present. However, this technique being known is not shown and does not constitute a portion of the present invention.

Holding of the telephone line is provided by a line terminating network 103 as shown in FIG. 3. This network conventionally consists of a retard coil and 600 resistor.

As will be obvious from the following description a slight modification of each telephone station instrument will be required if the instrument is equipped with a conventional rotary dial. This modification consists of the application of ground at the dial off-normal springs such as 203 as shown in telephone station 1 of FIG. 2. In the case of touch-calling instruments such modification is not required.

Assuming now, for purposes of description, that a subscriber located at telephone station 1 wishes to initiate a call, the following sequence of operations will take place. On removal of the handset (not shown) from the hookswitch, hookswitch contacts 201 and 202 will close completing a loop from ground through the coil of relay 210, contact 201, transmission network and handset 205 of telephone station 1, through dial contacts 204 and contact 202 and through the coil of relay 220 to battery. Completion of this loop, which supplies talking battery to the telephone station causes relays 210 and 220 to operate.

Operation of relay 210, at contacts 211 opens an operating path to prevent operation of relay 150. Operation of relay 220 at contacts 222 completes a portion of an operating path to relay 150. However, because the operating path is simultaneously opened at contacts 211 relay 150 is prevented from operating. At contacts 221 ground is extended to the delay network 270 which will cause relay 190 to operate after a 12-second delay. At contacts 223 ground is extended through resistor R4 to relay 180, causing relay 180 to operate. At contacts 224 a circuit from the "R" conductor extending to the telephone line is prepared at contacts 224 for completion of the talking path to telephone station 1.

When relay 180 is operated, ground is extended at contacts 182 to prepare a locking path for relay 190 which operates after the 12-second delay caused by network 270. This delay network may be of any conventional design, the only requirement that it provide an output of ground potential, after a 12-second delay, in response to application of a ground potential on its input. At contacts 181 the operating path for relay 140 is opened to prevent operation of relay 140 at this time. At contacts 183 a circuit for future operation of relay 160 is prepared. At contacts 185 the "T" conductor from the telephone line is extended through contacts 165 and capacitor C4 to terminal T1 of the telephone station 1. At contacts 186 the previously prepared talking path extending from the "R" conductor of the telephone line to terminal R1 of the telephone station is completed.

At contacts 184 a connection to battery through previously charged capacitor C3 is completed to the coil of relay 180. This will make relay 180 slow-to-release. This function is necessary to maintain relay 180 operated during the dialing or when the telephone station is placed in the hold condition which occurs when the subscriber operates the hookswitch momentarily, or dials the digit 1.

At this time the subscriber at telephone station 1 will operate his dial or touch-calling signaling device to achieve the necessary connection, through the central office associated with the telephone line, to a desired subscriber.

When the subscriber operates his dial at telephone station 1 "off normal" springs 203 provide ground extended through hookswitch contacts 201 to relay 210 causing it to be shunted and accordingly restored. At contacts 211 ground is extended through previously operated contacts 222 to operate relay 150. Operation of relay 150 places a shunt around the terminating network 103. Relay 220 will now follow dial impulse springs 204 and at associated contacts 224 apply pulses which are extended over the T and R leads to the telephone central office to effect selection of the desired or called telephone. When the dial returns to its normal position relay 150 will remain operated for a period of time because of its slow-to-release characteristics determined by the capacitance- resistance network consisting of C2 and R2 connected to relay 150 at contacts 151. Thus the terminating network 103 will remain shunted at contacts 152 during dialing.

If the telephone instruments located at telephone stations 1, 2, etc. are the touch-calling multifrequency type, the "off-normal" springs 203 and pulsing springs 204 would not be present. Selected multifrequency tones would merely be extended from the telephone subset over hookswitch contact 201 through capacitor C4 and contacts 165 and 185 to the T-side of the telephone line and through hookswitch contacts 202, capacitor C5 and contacts 165, 186, and 224 to the R-side of the telephone line. Appropriate signaling tones would then be extended over the telephone line to the telephone central office for operation of the switching equipment thereat to select the desired telephone station. After establishment of the connection, conversation of course ensues.

After the 12-second delay caused by network 270 relay 190 operates locking to ground through its associated contacts 191 and through previously operated contacts 182. At contact 192 an operating path for relay 170 and subsequently relay 160 is prepared.

If at any time during the course of the conversation the subscriber at telephone station 1 desires to continue the conversation from any other telephone station such as 2 through 10 (3-9 are not shown) the subscriber operates the hookswitch momentarily just once. This momentary operation opens contacts 201 and 202 and causes relays 210 and 220 to momentarily restore.

If the telephone is equipped with a rotary dial, the subscriber may dial the digit "1". This action extends ground at dial off-normal contact 203 to relay 210, causing it to momentarily restore, and operating ground is removed from relay 220 at dial pulsing contact 203, causing it to momentarily restore.

The momentary restoration of relay 220 extends ground through contacts 223, 243, 263, previously operated contacts 192 and contacts 164 to the coil of relay 170 causing it to operate. Contacts 171 then complete an operating path for relay 160. This latter circuit is completed from the coil of 160 through contacts 132 and 111 to ground. Operation of relay 160 places the terminating network 103 directly across the T and R conductors that extend to the telephone central office at contacts 165 and 166 respectively, to hold the telephone line. At contacts 161 the hold timeout network 102 is actuated. This circuit like the delay network 270 may be of any well-known design.

The hold timeout network 102 operates relay 110 to release hold relay 160 at contacts 111 after a predetermined period of time usually in the nature of several minutes. This feature prevents the line from being held if a subscriber does not return to resume the conversation. This latter feature is particularly important in the case of toll calls, where holding the telephone line for extended period of time without further response could result in large toll charges, as well as tying up toll switching facilities.

At contacts 162 an operating path for relay 140 is prepared. This relay however is not operated at this time because operating ground is not available at contacts 181 since relay 180 is still operated at this time. A path to maintain relay 190 operated is established at this time at contacts 163 anticipating the release of relay 180. At contacts 164 a holding path is extended to the coil of relay 170. This keeps relays 160 and 170 operated in series. The subscriber now returns the handset to the hookswitch of telephone station 1 and relay 180 is restored.

As noted previously failure to remove one of the telephone station handsets from its associated hookswitch within the predetermined period associated with the hold timeout network 102 will cause relay 110 to operate. Assuming these conditions are present operation of relay 110 will at contacts 111 remove ground from relay 160 causing both relays 160 and 170 to restore. Relay 190 will also restore as a result of restoration of relay 160. Inasmuch as relays 210 and 220 would have previously been restored relay 180 will restore and all relays in the circuit will be returned to normal.

Assuming now that the subscriber moves to another telephone station such as telephone station 2 and the hold timeout network 102 has not yet caused operation of relay 110, removal of the handset from the hookswitch will operate hookswitch contacts at telephone station 2 similar to contacts 201 and 202 at telephone station 1, to complete a loop from battery to ground that extends from battery through the coil of relay 240 through telephone station 2 by way of terminal R2 and then from terminal T2 through the coil of relay 230 to ground. In a manner similar to that previously outlined, ground will be extended at contacts 241 to the 12 second delay network 270 causing it (after a delay of 12 seconds) to again extend operating potential to relay 190. Relay 190 however is in the operate condition over its previously operated path.

At contacts 243 ground is extended to reoperate relay 180. When relay 180 restored previously, ground was returned at contacts 181 and extended through contacts 162 of operated relay 160 to operate relay 140. At associated contacts 141 ground was extended to relay 130. However relay 130 did not operate at this time inasmuch as ground was also present on the other side of its coil through contacts 121 associated with relay 120. When relay 180 is reoperated, ground is removed at contacts 181. At this time a path for operation of relay 140 and relay 130 in series exists from battery through the coil of relay 140, operated contacts 141, the coil of relay 130 and contacts 121 to ground. Operation of relay 130 at this time extends ground at contacts 131 through resistance R1 to slow-to-operate relay 120 causing it to operate. At contacts 132 operation of relay 130 breaks the holding path for the holding relay 160 causing it to restore.

At this time the hold timeout network 102 is deactuated at contacts 161, the operating path for relay 140 is broken at restored contacts 162, the holding path for relay 190 at contact 163 is broken and the initial operating path for relay 170 is restored at contacts 164 causing relay 170 to restore. At contacts 165 and 166 the holding bridge is removed from its contacts directly across the T and R leads extending to the telephone central office and replaced in the circuit across the leads extending to the T2 and R2 terminals of telephone station 2 and relays 130, 140 and 120 restore. At this point conversation may be renewed with the subscriber now at telephone station 2 rather that at telephone station 1.

Alternately the subscriber could have returned to station 1, to renew his conversation. Operation would be similar to that outlined above for continuing the conversation at station 1.

Needless to say the holding operation may be repeated innumerable times and the subscriber could use any of the instruments served such as telephone stations 1 through 10 with the requirement only, that the handset be replaced on the hookswitch of the last telephone involved in conversation.

What is claimed is:

1. A telephone line connected to a telephone central office, a plurality of telephone stations each comprising the usual telephone instrumentalities and each specifically including a hookswitch and a calling device; and a holding circuit including circuit connections to said telephone line and to each of said telephone stations, said holding circuit comprising: battery feed means connected to each of said telephone stations, operated in response to manual actuation of the hookswitch at a first one of said telephone stations to supply operating potential to said first telephone station; line connecting means operated in response to said operated battery feed means to connect said telephone line to said first telephone station; line terminating means; hold means operated in response to the manual momentary restoration and further reoperation of said hookswitch at said first telephone station, to disconnect said telephone line from said first telephone station and connect said telephone line to said line terminating means; alternatively said hold means operated in response to manual operation of said calling device at said first telephone station to select the digit "1"; and said battery feed means terminating operating potential to said first telephone station in response to manual restoration of said first telephone hookswitch.

2. The combination as claimed in claim 1 wherein: said hookswitch at a second one of said telephone stations is actuated to operate said battery feed means to supply operating potential to said second telephone station; and said holding circuit further includes hold removal means operated in response to reoperation of said battery feed means, to restore said hold means; said hold means in response to restoration, effective to disconnect said line terminating means from said telephone line and connect said telephone line to said second telephone station.

3. The combination as claimed in claim 1 wherein: said first telephone station hookswitch is further actuated, and in response to said further actuation, said battery feed means is reoperated to supply operating potential to said first telephone station; and said holding circuit further includes hold removal means operated in response to reoperation of said battery feed means, to restore said hold means; and said hold means in response to restoration effective to disconnect said line terminating means from said telephone line and reconnect said telephone line to said first telephone station.

4. The combination as claimed in claim 1 wherein; said holding circuit further includes hold timeout means operated in response to operation of said holding means, to restore said hold means after a predetermined period of time and thereby remove said line terminating means from said telephone line.

5. The combination as claimed in claim 1 wherein:
said holding circuit further includes delay means connected between said battery feed means and said hold means, said delay means in response to operation of said battery feed means, operated to condition said hold means for operation, after a predetermined period of time.

6. The combination as claimed in claim 1 wherein:
said battery feed means comprise a plurality of pairs of battery feed relays, each pair associated with an individual one of said telephone stations.

7. The combination as claimed in claim 1 wherein:
said line-connecting means comprise a slow-to-release relay.

* * * * *